US006950916B2

(12) United States Patent
Goodman

(10) Patent No.: US 6,950,916 B2
(45) Date of Patent: Sep. 27, 2005

(54) DYNAMICALLY SETTING THE OPTIMAL BASE ADDRESSES OF PROCESS COMPONENTS

(75) Inventor: Kevin Goodman, Alpharetta, GA (US)

(73) Assignee: RTO Software, Inc., Alpharetta, GA (US)

( * ) Notice: Subject to any disclaimer, the term of this patent is extended or adjusted under 35 U.S.C. 154(b) by 687 days.

(21) Appl. No.: 10/062,619

(22) Filed: Jan. 31, 2002

(65) Prior Publication Data

US 2002/0124150 A1 Sep. 5, 2002

Related U.S. Application Data

(60) Provisional application No. 60/265,684, filed on Jan. 31, 2001.

(51) Int. Cl.[7] .................. G06F 12/00

(52) U.S. Cl. .................. 711/165; 719/331

(58) Field of Search .................. 711/161–162, 165, 711/202–203, 205–206, 209, 220–221; 707/204; 719/331–332

(56) References Cited

U.S. PATENT DOCUMENTS 4,314,342 A * 2/1982 McNeir et al. ............. 700/100
4,758,951 A * 7/1988 Sznyter, III ................. 711/206
5,119,291 A * 6/1992 Flannagan et al. ............. 711/4
5,535,399 A * 7/1996 Blitz et al. ..................... 714/6
5,875,487 A 2/1999 Schwartz et al. ........... 711/202
5,940,868 A 8/1999 Wagner ...................... 711/202
5,943,066 A 8/1999 Thomas et al. ............. 345/515
5,960,466 A 9/1999 Belgard ...................... 711/213
6,047,362 A * 4/2000 Zucker ....................... 711/203
6,061,773 A 5/2000 Harvey et al. .............. 711/206
6,065,104 A 5/2000 Tng ........................... 711/209
6,105,117 A 8/2000 Ripley ........................ 711/165
6,205,580 B1 3/2001 Hirose ......................... 717/11
6,253,258 B1 * 6/2001 Cohen ........................ 719/331
6,304,951 B1 10/2001 Mealey et al. .............. 711/206
6,681,329 B1 * 1/2004 Fetkovich et al. .......... 713/189
2002/0073082 A1 * 6/2002 Duvillier et al. ............... 707/3

* cited by examiner

*Primary Examiner*—Nasser Moazzami
(74) *Attorney, Agent, or Firm*—King & Spalding LLP

(57) ABSTRACT

Processes are monitored to determine if all of their components are loaded from persistent storage into memory at their preferred base addresses. Each of the components is examined to determine if that component's in-memory base address matches the preferred base address of its on-disk representation. If a base address collision is detected, the on-disk representation of the preferred base address is updated to reflect the new in-memory base address.

37 Claims, 3 Drawing Sheets

DYNAMICALLY SETTING THE OPTIMAL BASE ADDRESSES OF PROCESS COMPONENTS

RELATED APPLICATION

The present application claims the benefit of U.S. Provisional Patent Application Ser. No. 60/265,684 filed Jan. 31, 2001, which is hereby incorporated by reference as if set forth fully herein.

FIELD OF THE INVENTION

The present invention relates generally to the elimination of base address collisions in computer software programs. More particularly, the present invention relates to dynamically setting the optimal base address of process components in order to eliminate base address collisions.

BACKGROUND OF THE INVENTION

A computer's operating system, such as the Microsoft Windows operating system ("Windows"), may be configured to specify that each process have its own private virtual address space. By way of example, Windows uses a technique known as memory-mapping to load the components of a process (such as the executable file and any associated dynamic link libraries) from persistent storage (e.g., disk or tape) into memory (e.g., random access memory ("RAM")). In order to allow memory-mapping to operate more efficiently, each component of a process may be assigned what is known as a preferred base address within the memory. As is known in the art, it is possible to set the base address of a component at design time.

While many developers do set base addresses at design time, this process does not ensure that a component will always load at its preferred base address. For example, an operating system may not be able to load a component of a process at its preferred base address if the operating system has already loaded some other process component at that address. If any component of the process cannot be loaded at its preferred base address, the operating system must perform additional logic to relocate that component to a different location in memory. The process of relocating a component consumes valuable time and memory resources.

Thus, there remains a need for ensuring that each component of a process loads at its preferred base address. There further remains a need for optimally determining the correct preferred base addresses of a component prior to run time.

SUMMARY OF THE INVENTION

The present invention meets the needs described above by providing systems and methods for attempting to ensure that all components of a process load at their preferred base addresses. In one embodiment, the present invention detects that a process has been loaded from persistent storage into memory. The present invention then determines if any of the components of the process have been relocated by the operating system to a memory address other than that component's preferred base address. In response to determining that a component's in-memory base address is not equivalent to the component's on-disk representation of the preferred base address, the present invention updates the on-disk representation to reflect the in-memory base address. The components of the process should thus load at their updated base addresses the next time the process is executed.

These and other aspects, features and advantages of the present invention may be more clearly understood and appreciated from a review of the following detailed description of the disclosed embodiments.

DETAILED DESCRIPTION OF EXEMPLARY EMBODIMENTS

The present invention is directed to systems and methods for monitoring the initialization of a software process in order to determine if all of the components of the process load at their preferred base addresses. Should any component of the process load at a new base address, as opposed to its preferred base address, the on-disk representation of that component is updated to reflect the new base address.

Figure 1:
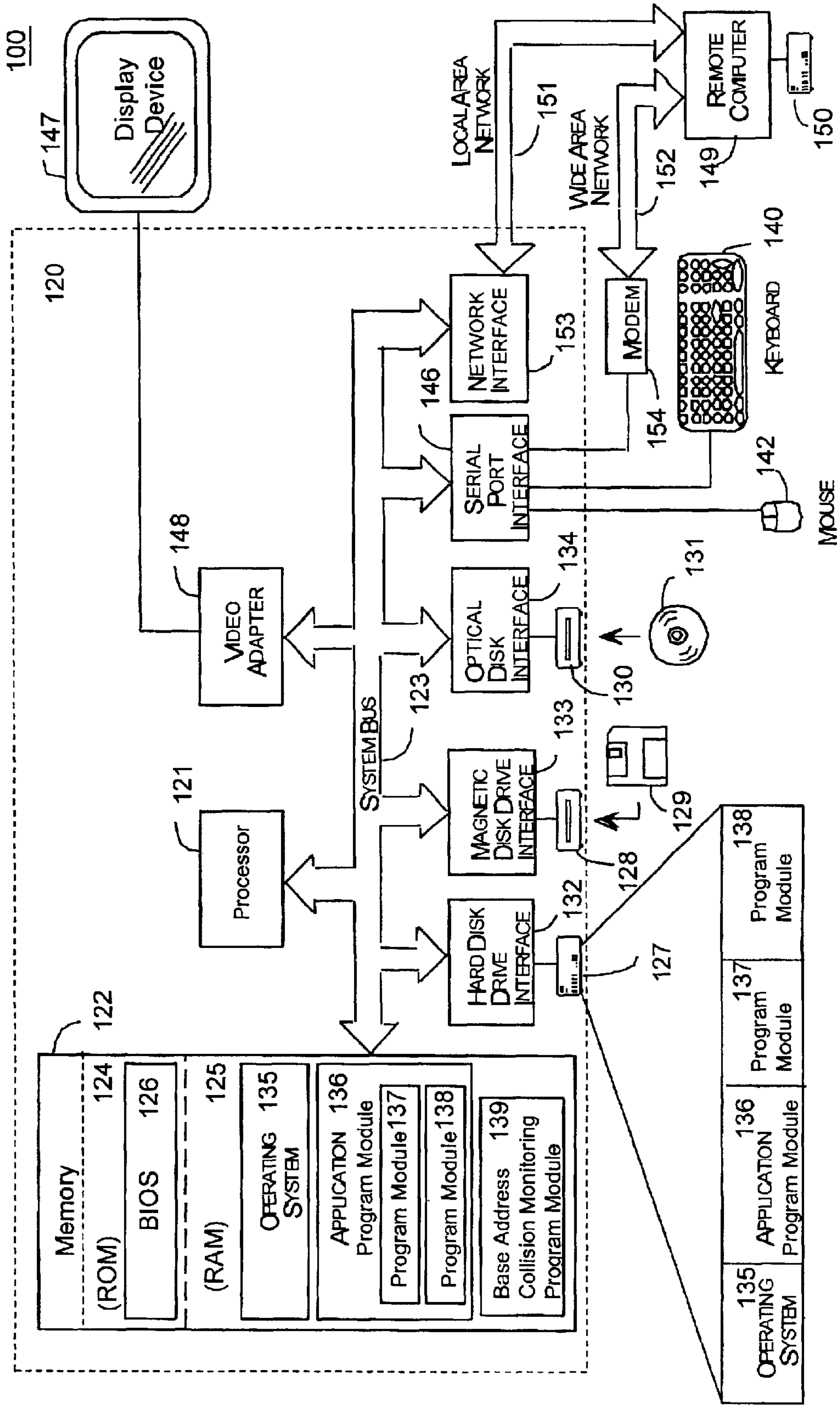
FIG. 1 is a block diagram of a personal computer system, illustrating an exemplary operating environment for implementation of an illustrative embodiment of the present invention.

The following description will hereinafter refer to the drawing, in which like numerals indicate like elements throughout the several figures. FIG. 1 and the following discussion are intended to provide a brief and general description of a suitable computing environment for implementing the present invention. Although the system shown in FIG. 1 represents a conventional personal computer system 100, those skilled in the art will recognize that the invention also may be implemented using other types of computer system configurations. The computer system 100 includes a processing unit 121, a system memory 122 and a system bus 123 that couples the system memory 122 to the processing unit 121. The system memory 122 includes read only memory (ROM) 124 and random access memory (RAM) 125. A basic input/output system 126 (BIOS), containing basic routines that help to transfer information between elements within the personal computer system 100, such as during start-up, is stored in ROM 124.

The personal computer system 100 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 100. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the persistent storage devices (e.g., hard disk drive 127) and the memory 122 (e.g., RAM 125), including an operating system 135, one or more application program modules 136, and other program modules 137 and 138. Program modules 137 and 138 may comprise components of the application program module 136. An application program module is also referred to generally as a process. The methods of the present invention may also be implemented as a program module, referred to herein as Base Address Collision Monitoring Program Module 139, and comprising computer-executable instructions stored on a computer-readable medium of the computer system 100.

Other input devices (not shown) may include a microphone, joystick, game pad, satellite dish, scanner, or the like. These and other input devices are often connected to the processing unit 121 through a serial port interface 146 that is coupled to the system bus 123, but may be connected by other interfaces, such as a game port or a universal serial bus (USB). A display device 147 is also connected to the system bus 123 via an interface, such as a video adapter 148. In addition to display device, personal computer systems typically include other peripheral output devices (not shown), such as speakers or printers.

The personal computer system 100 may operate in a networked environment using logical connections to one or more remote computer systems, such as a remote computer system 149. The remote computer system 149 may be a server, a router, a peer device or other common network node, and typically includes many or all of the elements described above relative to the personal computer system 100, although only a storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 100 is connected to the LAN 151 through a network interface 153. When used in a WAN networking environment, the personal computer system 100 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 100, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Figure 2:
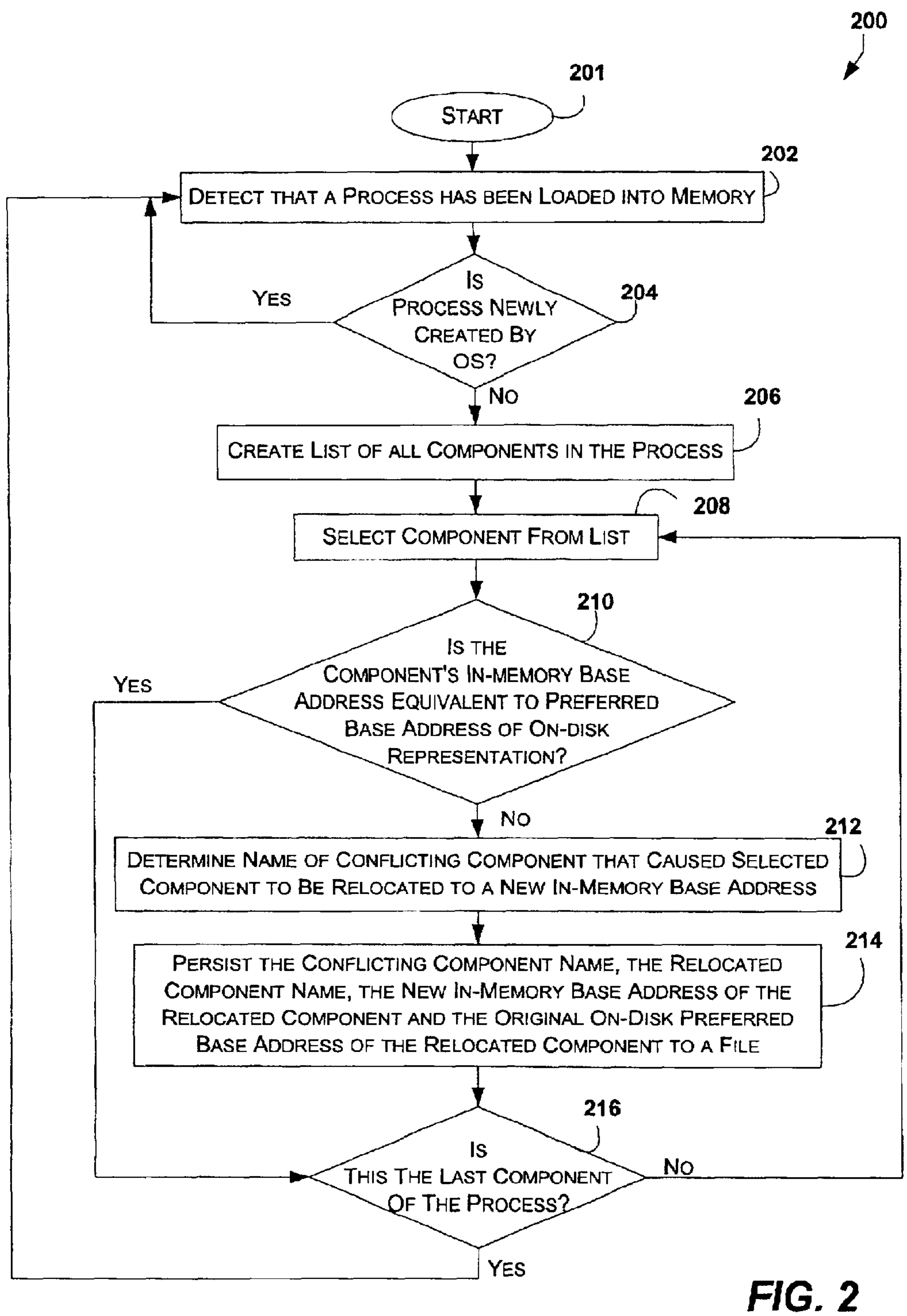
FIG. 2 is a flow chart illustrating an exemplary method for determining if any of the components of a process are relocated to a new base address.

FIG. 2 is a flow chart illustrating an exemplary method 200 for monitoring the loading of a process in order to determine if any of the components of the process are relocated to a new base address. The method 200 begins at starting block 201, where a computer system, such as the computer 100 of FIG. 1, initializes one or more software processes, such as the application program 136 of FIG. 1. At step 202, it is detected that the operating system 135 of the computer system 100 has loaded a process into memory 122. At step 204, it is determined whether the process loaded into memory has been newly created by the operating system (i.e., whether the process was loaded into memory within a specified time limit). If the process has been newly created by the operating system, the method returns to step 202 to await detection of the loading of another process. A newly created process is skipped, for the time being, because it is likely that a significant number of its components have not yet been loaded into memory. However, if the process being loaded into memory is not newly created by the operating system, the method advances to step 206, where a list is created to enumerate all of the components in the process.

At step 208, a first component is selected from the list of components in the process. Then at step 210, a determination is made as to whether the in-memory base address of the selected component is equivalent to the on-disk representation of its preferred base-address. If the in-memory base address of the selected component is equivalent to the on-disk representation of its preferred base-address, the method advances to step 216 for a determination as to whether the selected component is the last component in the process. However, if at step 210 the in-memory base address of the selected component is determined not to be equivalent to the on-disk representation of its preferred base-address (i.e., the selected component has been relocated to a new in-memory base address due to a conflicting component having previously been loaded at the preferred base address of the selected component), the name of the conflicting component is determined at step 212.

Figure 3:
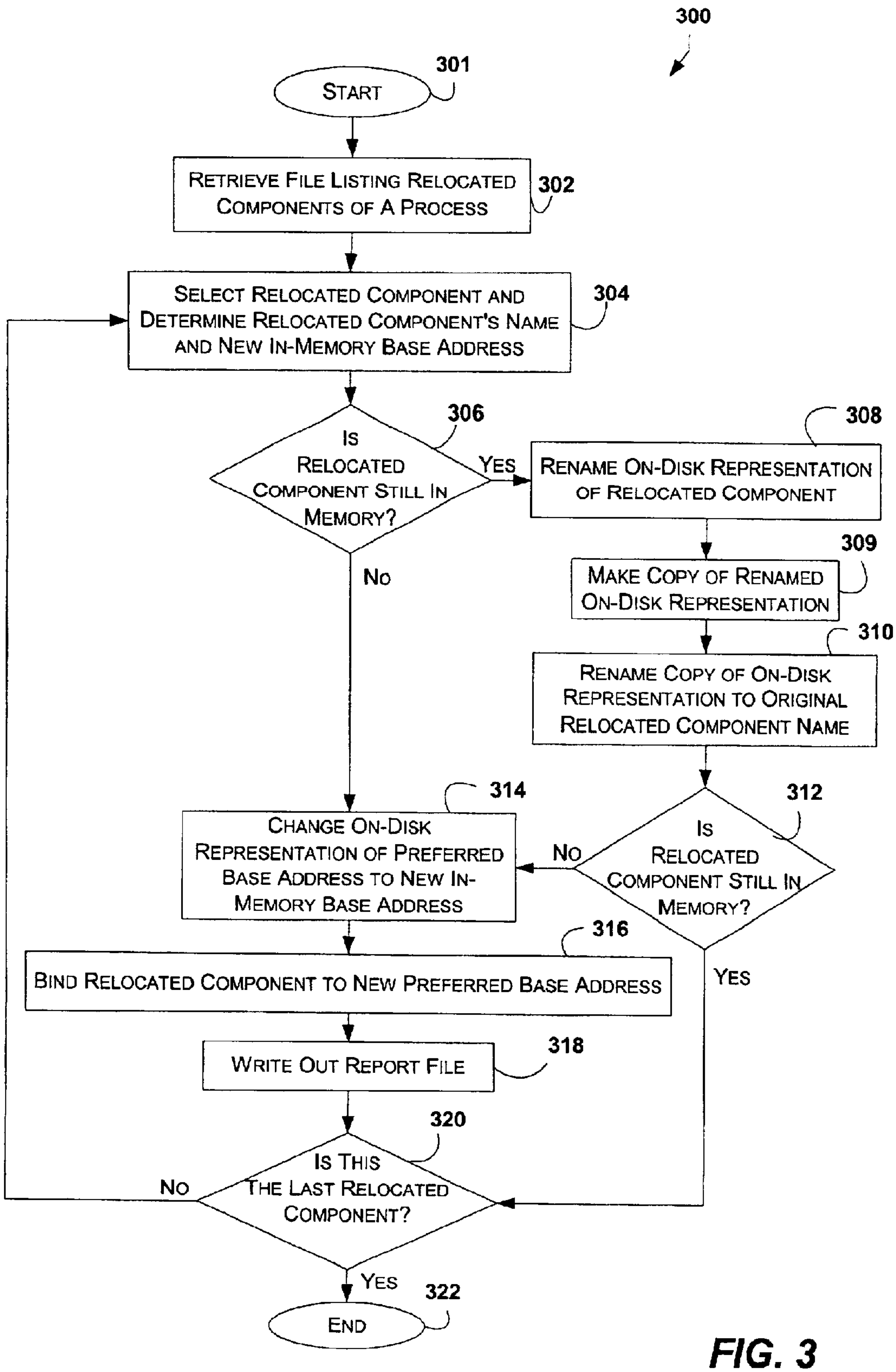
FIG. 3 is a flow chart illustrating an exemplary method for dynamically updating a component's preferred base address in accordance with an illustrative embodiment of the present invention.

From step 212, the method moves to step 214, where the name of the conflicting component, the relocated component's file name, the new in-memory base address of the relocated component and the original on-disk representation of the relocated component's preferred base address are persisted to a file for further processing and for reporting purposes (see FIG. 3). Next, at step 216 a determination is made as to whether the selected component is the last component in the process. If the selected component is not the last component in the process, the method returns to step 208 for selection of the next component. The method is repeated from step 208 to step 216, as previously described, until the selected component is determined to be the last component in the process. When the selected component is determined at step 216 to be the last component in the process, the method returns to step 202 to await detection that another process has been loaded into memory.

FIG. 3 is a block diagram illustrating an exemplary method 300 for dynamically updating a component's preferred base address. The method begins at starting block 301 and advances to step 302, where a file listing all relocated components of a process is retrieved (e.g., from persistent storage). At step 304, a first relocated component is selected and it's new in-memory base address and on-disk representation of preferred base address are read from the data file. At step 306, a check is made to determine if the selected relocated component is still loaded in memory. Those skilled in the art will know that the on-disk representation of a component's preferred based address cannot be updated while the component is loaded into memory. Those skilled in the art will also appreciate, however, that there are techniques to "trick" an operating system into allowing an on-disk representation of a preferred base address to be updated while the component is loaded in memory.

For example, while a component is loaded into memory, it is possible to rename the on-disk representation of the component, make a copy of the renamed on-disk representation of the component and then rename the copy back to the original component name. This technique causes the in-memory component and its associated on-disk representation to be assigned a new component name, while the original component name is assigned to a "new" on-disk representation of that component. The new on-disk representation of the component should no longer have an associated in-memory component, meaning that the preferred base address of the new on-disk representation can be modified. Subsequent calls by the operating system for the original component name, will cause the new on-disk representation to be loaded into the modified base address location.

Those skilled in the art will appreciate that other techniques may be employed to modify the preferred base address of an on-disk representation of a component. By way of example, a "copy-on-reboot" method may be employed. However, such a method may not be desirable because it requires that the computer system be restarted. In addition, the process(es) to which the component belongs may be terminated so that the on-disk representations can be modified.

Returning to FIG. 3, if it determined at step 306 that the selected relocated component is not still in memory, the method can proceed directly to step 314. At step 314, the on-disk representation of the relocated component's preferred base address is changed to match the new in-memory base address of that component (as determined from the file loaded at step 302). However, if it is determined at step 306 that the selected component is still in memory, the method proceeds to step 308. At step 308, the on-disk representation of the selected component is renamed to a back-up component name. Then at step 309, a copy is made of the renamed on-disk representation. Next at step 310, the copy of the renamed on-disk representation is renamed back to the original relocated component name. At step 312, a determination is made as to whether original relocated component name is still associated with an in-memory component. If the original relocated component name is still associated with an in-memory component, the renaming "trick" of steps 308–310 is deemed to have failed and the selected relocated component is momentarily skipped as the method advances to step 320 to determine if there are any other relocated components of the process.

However, if it is determined at step 312 that the original relocated component name is no longer associated with an in-memory component, the renaming "trick" of steps 308–310 is deemed to have succeeded and the method proceeds to step 314 where the preferred base address of the on-disk representation having the original (i.e., selected) relocated component name is changed to match the new in-memory base address of that component (as determined from the file loaded at step 302). Those having ordinary skill in the art will know that the Microsoft Windows operating system provides the Application Programming Interface (API) call "RebaseImageEx" for the purpose of changing on-disk representations of base addresses. Other operating systems may provide similar API calls. Also familiar to those having ordinary skill in the art will be the necessity to bind the selected relocated component to its updated on-disk representation of its preferred base address. Windows provides the API call "BindImageEx" for the purpose of binding components to base addresses and other operating systems may provide similar API calls. At step 316, the selected relocated component is bound to its new preferred base address.

At step 318, a report file is written out for auditing purposes. Then, at step 320, a determination is made as to whether the selected relocated component is the last relocated component of the process. If the selected relocated component is not the last relocated component of the process, the method returns to step 304 for selection of the next relocated component. The method is repeated from step 304 to step 320, as previously described, until it is determined that the selected relocated component the last relocated component of the process. When the selected relocated component is determined at step 320 to be the last relocated component of the process, the method ends at step 322.

As may be seen from the foregoing, the present invention provides systems and methods for dynamically setting the optimal base address of a component of a process. After the optimal base address is set, the process may be loaded from persistent storage into memory without base address collisions. Those skilled in the art will appreciate that the foregoing description of the invention was provided by way of example only and that many other modifications, features, embodiments and operating environments of the present invention are possible. It should also be appreciated that the exemplary aspects of the present invention as described above are not intended to be interpreted as required or essential elements of the invention, unless explicitly stated otherwise.

What is claimed is:

1. A method for dynamically setting an optimal base address for a component of a process comprising:

detecting that a process has been loaded from a persistent storage into a memory of a computer system, wherein said process is comprised of one or more components;

for each of said components, determining whether an in-memory base address of a copy of the component loaded into the memory is equivalent to a preferred base address of an on-disk representation of the component stored in the persistent storage; and in response to determining that for a selected component the in-memory base address is not equivalent to the preferred base address, updating the on-disk representation of the selected component to reflect the in-memory base address.

2. A computer readable medium having stored thereon computer executable instruction for performing the method of claim 1.

3. The method of claim 1, wherein detecting that the process has been loaded from the persistent storage into the memory further comprises the steps of:

determining if the process has been loaded into the memory within a specified time limit; and if the process has been loaded into the memory within the specified time limit, awaiting a detection that another process has been loaded from the persistent storage into the memory.

4. The method of claim 1, further comprising the step of saving an audit report for recording transaction data associated with the step of updating the on-disk representation of the selected component to reflect the in-memory base address.

5. The method of claim 1, wherein the step of determining, for each of said components, whether the in-memory base address of the copy of the component loaded into the memory is equivalent to the preferred base address of the on-disk representation of the component comprises:

creating a list of all of the components in the process; and for each component in the list, comparing the in-memory base address of the copy of the component loaded into the memory to the preferred base address of the on-disk representation of the component.

6. The method of claim 1, wherein the step of determining that for the selected component the in-memory base address is not equivalent to the preferred base address further comprises determining that a conflicting component caused a copy of the selected component to be relocated to the in-memory base address.

7. A computer readable medium having stored thereon computer executable instruction for performing the method of claim 6.

8. The method of claim 6, further comprising the step of recording relocation information to a file, wherein said relocation information identifies the conflicting component, the selected component, the in-memory base address of the copy of the selected component and the preferred base address of the on-disk representation of the selected component.

9. The method of claim 8, wherein updating the on-disk representation of the selected component to reflect the in-memory base address comprises:

based on the relocation information, changing the preferred base address of the on-disk representation of the selected component to the in-memory base address; and binding the on-disk representation of the selected component to the in-memory base address.

10. A computer readable medium having stored thereon computer executable instruction for performing the method of claim 9.

11. The method of claim 8, further comprising the steps of:

prior to changing the preferred base address of the on-disk representation of the selected component to the in-memory base address, determining that the copy of the selected component is still loaded in the memory; and in response to determining that the copy of the selected component is still loaded in the memory, employing a technique to allow the preferred base address of the on-disk representation of the selected component to be changed while the copy of the selected component remains in the memory.

12. The method of claim 11, wherein said technique comprises:

renaming the on-disk representation of the selected component from an original name to a new name;

making a copy of the renamed on-disk representation of the selected component; and renaming the copy of the renamed on-disk representation of the selected component to the original name.

13. A computer readable medium having stored thereon computer executable instruction for performing the method of claim 12.

14. The method of claim 1, wherein updating the on-disk representation of the selected component to reflect the in-memory base address comprises:

changing the preferred base address of the on-disk representation of the selected component to the in-memory base address; and binding the on-disk representation of the selected component to the in-memory base address.

15. The method of claim 14, further comprising the steps of:

prior to changing the preferred base address of the on-disk representation of the selected component to the in-memory base address, determining that a copy of the selected component is still loaded in the memory; and in response to determining that the copy of the selected component as still loaded in the memory, employing a technique to allow the preferred base address of the on-disk representation of the selected component to be updated while the copy of the selected component remains in the memory.

16. The method of claim 15, wherein said technique comprises:

renaming the on-disk representation of the selected component from an original name to a new name;

making a copy of the renamed on-disk representation of the selected component; and renaming the copy of the renamed on-disk representation of the selected component to the original name.

17. A computer readable medium having stored thereon computer executable instruction for performing the method of claim 16.

18. Then method of claim 1, wherein updating the on-disk representation of the selected component comprises:

calling an Application Programming Interface function provided by an operating system of the computer system, wherein said Application Programming Interface function is programmed to change the on-disk representation of the selected component.

19. The method of claim 18, wherein the Application Programming Interface function is RebaseImageEx.

20. The method of claim 18, wherein updating the on-disk representation of the selected component further comprises:

calling a second Application Programming Interface function provided by the operating system, wherein said second Application Programming Interface function is programmed to bind the on-disk representation of the selected component to the in-memory base address.

21. The method of claim 20, wherein the second Application Programming Interface function is BindImageEx.

22. A system for dynamically setting an optimal base address for a component of a process comprising:

a persistent storage for storing a process, the process comprising one or more components;

a memory being logically divided into a plurality of in-memory addresses; and a processor for executing computer-executable instructions for:

detecting that one or more of the components of the process have been loaded from the persistent storage into the memory, for each of the components, determining whether the in-memory base address of a copy of the component loaded into the memory is equivalent to the preferred base address of the on-disk representation of the component stored in the persistent storage, and in response to determining that for a selected component the in-memory base address is not equivalent to the preferred base address, updating the on-disk representation of the selected component to reflect the in-memory base address.

23. The system of claim 22, wherein detecting that the process has been loaded from the persistent storage into the memory further comprises the steps of:

determining if the process has been loaded into the memory within a specified time limit; and if the process has been loaded into the memory within the specified time limit, awaiting a detection that another process has been loaded from the persistent storage into the memory.

24. The system of claim 22, wherein the processor executes further computer-executable instructions for; creating an audit report for recording transaction data associated with updating the on-disk representation of the selected component to reflect the in-memory base address.

25. The system of claim 22, wherein determining, for each of said components, whether the in-memory base address of the copy of the component loaded into the memory is equivalent to the preferred base address of the on-disk representation of the component comprises:

creating a list of all of the components in the process; and for each component in the list, comparing the in-memory base address of the copy of the component loaded into the memory to the preferred base address of the on-disk representation of the component.

26. The system of claim 25, wherein determining that for the selected component the in-memory base address is not equivalent to the preferred base address further comprises determining that a conflicting component caused a copy of the selected component to be relocated to the in-memory base address.

27. The system of claim 26, wherein the processor executes further computer-executable instructions for recording relocation information to a file; and wherein said relocation information identifies the conflicting component, the selected component, the in-memory base address of the copy of the selected component and the preferred base address of the on-disk representation of the selected component.

28. The system of claim 27, wherein updating the on-disk representation of the selected component to reflect the in-memory base address comprises:

based on the relocation information, changing the preferred base address of the on-disk representation of the selected component to the in-memory base address; and binding the on-disk representation of the selected component to the in-memory base address.

29. The system of claim 28, wherein the processor executes further computer-executable instructions for:

prior to changing the preferred base address of the on-disk representation of the selected component to the in-memory base address, determining that the copy of the selected component is still loaded in the memory; and in response to determining that the copy of the selected component is still loaded in the memory, employing a technique to allow the preferred base address of the on-disk representation of the selected component to be changed while the copy of the selected component remains in the memory.

30. The system of claim 29, wherein said technique comprises:

renaming the on-disk representation of the selected component from an original name to a new name;

making a copy of the renamed on-disk representation of the selected component; and renaming the copy of the renamed on-disk representation of the selected component to the original name.

31. The system of claim 22, wherein updating the on-disk representation of the selected component to reflect the in-memory base address comprises:

based on the relocation information, changing the preferred base address of the on-disk representation of the selected component to the in-memory base address; and binding the on-disk representation of the selected component to the in-memory base address.

32. The system of claim 31, wherein the processor executes further computer-executable instructions for:

prior to changing the preferred base address of the on-disk representation of the selected component to the in-memory base address, determining that a copy of the selected component is still loaded in the memory; and in response to determining that the copy of the selected component is still loaded in the memory, employing a technique to allow the preferred base address of the on-disk representation of the selected component to be changed while the copy of the selected component remains an the memory.

33. The system of claim 32, wherein said technique comprises:

renaming the on-disk representation of the selected component from an original name to a new name;

making a copy of the renamed on-disk representation of the selected component; and renaming the copy of the renamed on-disk representation of the selected component to the original name.

34. The system of claim 22 wherein updating the on-disk representation of the selected component comprises:

calling an Application Programming Interface function provided by an operating system of the computer system, wherein said Application Programming Interface function is programmed to change the on-disk representation of the selected component.

35. The system of claim 34, wherein Application Programming Interface function is RebaseImageEx.

36. The system of claim 34, wherein the on-disk representation of selected component further comprises:

calling a second Application Programming Interface function provided by the operating system, wherein said second Application Programming Interface function as programmed to bind the on-disk representation of the selected component to the in-memory base address.

37. The system of claim 36, wherein the second Application Programming Interface function is BindImageEx.

* * * * *